Oct. 12, 1965   W. SEAMONE   3,211,063
PRESSURE CONTROL SWITCHING VALVE
Filed Oct. 3, 1962
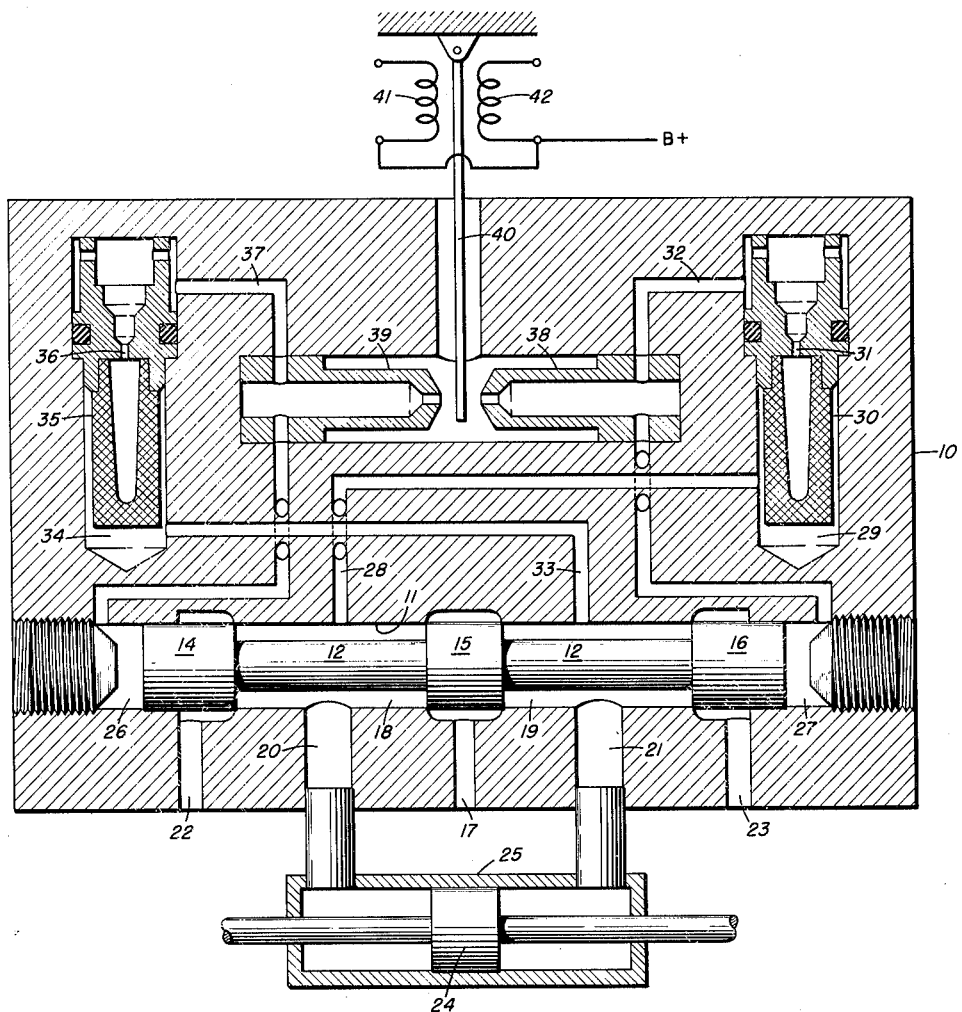
WOODROW SEAMONE
INVENTOR
BY  Claude Funkhouser
ATTORNEY United States Patent Office 3,211,063
Patented Oct. 12, 1965

3,211,063
PRESSURE CONTROL SWITCHING VALVE
Woodrow Seamone, Silver Spring, Md., assignor to the United States of America as represented by the Secretary of the Navy
Filed Oct. 3, 1962, Ser. No. 228,207
2 Claims. (Cl. 91—388)

The present invention relates in general to fluid servo control valves and more particularly relates to a pressure control valve which operates efficiently on either hydraulic fluid or pressurized gas.

The transfer valve of a conventional time modulated electrohydraulic servo system provides for electrical control by torque motor of a flapper suspended between two opposing jet nozzles whereby the flapper vibrates at a low amplitude and a high frequency producing a valve spool velocity proportional to the applied signal. The net-valve spoool displacement controls the flow of fluid to an actuator. A valve typical to the prior art is disclosed by John G. Chubbuck in U.S. Patent No. 2,797,666, patented July 2, 1957.

A very common characteristic of prior art transfer valves of the Chubbuck type is almost direct application of source pressure to the jet nozzles. The varying amount of restriction applied to one nozzle with respect to the other by the flapper produces a differential source pressure at either side of the valve spool thereby imparting the required motion to the spool. This conventional valve works very well with hydraulic fluid whose rate of flow may be easily and accurately controlled; however, for many applications where gas pressure is readily available, a transfer valve which will operate on a compressible fluid medium such as high pressure and high temperature gases is most desirable. The drawback to the use of gas pressure in a transfer valve of the Chubbuck type is that valve is of the flow control variety and flow control of gaseous medium may be accurately effected only if the compressibility of the gas can be held to a constant value. Depending on the compressibility of the gas a greater or lesser quantity of gas may be needed to produce a desired movement of the actuator. The resultant response of a flow control valve operating on gas pressure is very sluggish.

It is therefore an object of the present invention to provide a fluid servo control valve which will operate on both hydraulic fluid and gas pressure.

It is a further object of the present invention to provide a fluid servo control valve which operates on differential work pressure rather than fluid flow pressure.

It is still another object of the present invention to provide a fluid servo control valve which regulates fluid pressure rather than fluid flow and contains a feedback path in the pressure control loop.

It is still a further object of the present invention to provide a fluid servo control valve wherein the source of pressure for each upstream orifice is derived from the opposite load cylinder port rather than the supply pressure thereby providing a differential load feedback loop in the valve.

Other objects and many of the attendant advantages of this invention will be readily appreciated as the same becomes better understood by reference to the following detailed description when considered in connection with the accompanying drawing wherein the sole figure is a section view of one embodiment of the invention.

The embodiment illustrated in the figure comprises a valve body 10 which contains a cylindrical bore 11 for accommodating a valve spool 12 and lands 14, 15 and 16 for regulating the flow of pressure fluid from intake port 17 through work chambers 18 and 19 to load output ports 20 and 21, respectively. The construction of the valve spool 12 is such that fluid from the intake port 17 can leak past said land 15 when said valve spool 12 is in the position shown in the figure. Movement of the spool 12 serves to apply pressure to one of the load output ports 20 or 21 and to simultaneously connect the other load output port to one of the drain lines 22 or 23. The differential pressure between lines 20 and 21 causes the piston 24 in actuator 25 to experience an imbalance of hydraulic forces which results in the movement of the piston.

Movement of the spool 12 is effected by the creation of a differential pressure between the integrating chambers 26 and 27 on either side of the spool 12 in bore 11. This differential pressure is derived via a pressure control loop within the valve. Pressure from work chamber 18 is fed via internal channel 28 to a filter chamber 29 containing an appropriate filter 30 for removing foreign objects from the fluid. Flow limiting orifice 31 is interposed in chamber 29 to control the outflow of fluid therefrom which occurs by way of channel 32. In a like manner, the pressure from work chamber 19 is fed via internal channel 33 to a filter chamber 34 containing a filter 35 and then is passed through an orifice 36 to channel 37. The orifices 31 and 36 maintain the flow in channels 32 and 37 substantially constant despite pressure fluctuations in those channels. Channels 32 and 37 terminate, respectively, in integrating chambers 27 and 26 and are vented by nozzles 38 and 39, respectively.

The nozzles 38 and 39 oppose each other on opposite sides of a flapper 40 which preferably possesses a small mass so that inertial effects in the movement of the flapper will be held to a minimum. The flapper 40 vibrates in response to a control signal applied to torque motor coils 41 and 42 which are part of a valve control system, such as disclosed in the U.S. patent application U.S. Patent No. 3,140,427, of Robert A. Freiberg. The flapper 40 caps off either nozzle 38 or 39 in synchronism with the control signal and thereby produces a differential pressure in lines 32 and 37 which is applied to integrating chambers 26 and 27 on either end of spool 12. This pressure differential produces a shift in the spool 12 and a subsequent control of applied pressure to the output ports 20 and 21.

According to the invention, by providing the pressure to the orifices 31 and 36 from opposite work chambers 18 and 19, respectively, instead of by direct application from the pressure source, the valve output is pressure controlled rather than flow controlled. In the Chubbuck valve the position of the spool merely regulates the amount of fluid flow to one output port or the other and thus the pressure at that port receiving the flow of fluid is always at the same pressure, i.e., the source pressure. However, in the invention the differential pressure across the nozzles is reflected into the work chambers and across the actuator piston 24. Movement of this piston is thus based entirely upon pressure differential rather than fluid flow.

Since the nozzles 38 and 39 are essentially directly connected to the output ports 20 and 21 a feedback path is provided in the control loop which makes the valve highly stable and relatively insensitive to parameter changes. Furthermore all of the inherent advantages of the Chubbuck type valve are retained. That is, limitations such as spool friction, time delays due to spool mass, hysteresis, etc., have been eliminated.

Although the valve described herein was designed according to the invention to operate on gas pressure, it should be understood that either gas or hydraulic fluid could be used in its operation without loss of its inherently improved operating characteristics.

Obviously, many modifications and variations of the present invention are possible in the light of the above teachings. It is therefore to be understood that within the scope of the appended claims the invention may be practiced otherwise than as specifically described.

What is claimed is:
1. A pressure control valve comprising
   a pair of output conduits,
   a source of fluid pressure,
   a movable control spool located between said pressure source and each of said output conduits for selectively applying fluid pressure to one of said output conduits,
   an integrating chamber located on either end of said control spool whereby the creation of a pressure differential between said integrating chambers will effect a movement of said control spool,
   a nozzle connected to each integrating chamber for selectively venting said chambers in response to an external control signal, and
   means for providing a direct fluid path from the output conduit connected to said pressure source to the low pressure integrating chamber and for providing a direct fluid path from the other output conduit to the other integrating chamber so that said valve is responsive to differential fluid pressure rather than rate of fluid flow.

2. In a pressure controlled switching valve employing an acceleration switching control circuit, the combination including
   a valve body having a cylindrical bore extending longitudinally therewithin, said cylindrical bore being connected to first and second load output ports,
   an actuator,
   a piston disposed within said actuator,
   a pair of spaced conduits each disposed outwardly of opposite ends of said piston and extending outwardly from said actuator so as to communicate with one of said first and second load output ports,
   a source of pressurized fluid,
   means for communicating said pressurized fluid to said cylindrical bore,
   a pair of spaced passages for draining said pressurized fluid from said cylindrical bore,
   a movable control spool disposed within said cylindrical bore for selectively applying fluid pressure to said first and second load output ports and capable of controlling the flow of fluid from said source of pressurized fluid into said cylindrical bore while never completely stopping said flow,
   a pair of spaced integrating chambers disposed within said cylindrical bore outwardly of opposite ends of said control spool for providing a pressure differential across said control spool whereby it may be selectively moved toward or away from either of said integrating chambers,
   a pair of nozzles each connected to one of said integrating chambers for providing a pressure differential between said integrating chambers in response to an external control signal,
   a first channel connected to one of said integrating chambers and passing through one of said nozzles to said cylindrical bore so as to communicate with said first load output port and provide a direct fluid path between said first load output port and the integrating chamber to which said first channel is connected whereby the pressure in one of said spaced conduits may be sensed and communicated to that integrating chamber, and
   a second channel connected to the other of said integrating chambers and passing through the other of said nozzles to said cylindrical bore so as to communicate with said second load output port and provide a direct fluid path between said second load output port and the integrating chamber to which said second channel is connected whereby the pressure in the other of said spaced conduits may be sensed and communicated to that integrating chamber.

References Cited by the Examiner
UNITED STATES PATENTS

| | | | |
|---|---|---|---|
| 2,302,232 | 11/42 | MacNeil | 91—433 X |
| 3,033,232 | 5/62 | Bahniuk | 137—625.62 |
| 3,042,005 | 7/62 | Gray | 137—625.62 X |

ISADOR WEIL, *Primary Examiner.*

LAVERNE D. GEIGER, WILLIAM F. O'DEA,
*Examiners.*